(12) United States Patent
Le et al.

(10) Patent No.: US 6,747,849 B1
(45) Date of Patent: Jun. 8, 2004

(54) HIGH PERFORMANCE SUSPENSION WITH REDUCED FLOW-INDUCED VIBRATION

(75) Inventors: Hienminh Huu Le, San Jose, CA (US); Tzong-Shii Pan, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 188 days.

(21) Appl. No.: 09/531,872

(22) Filed: Mar. 21, 2000

(51) Int. Cl.$^7$ .............................................. G11B 21/16
(52) U.S. Cl. .................................................. 360/245.7
(58) Field of Search .................. 360/245.5, 245.7, 360/245, 244.2

(56) References Cited

U.S. PATENT DOCUMENTS

| | | | |
|---|---|---|---|
| 5,126,904 A | 6/1992 | Sakurai ................ | 360/244.2 |
| 5,353,181 A | 10/1994 | Frater et al. ............ | 360/245.3 |
| 5,771,136 A * | 6/1998 | Girard .................... | 360/104 |
| 5,812,342 A | 9/1998 | Khan et al. ............. | 360/244.9 |
| 6,219,203 B1 * | 4/2001 | Arya et al. ............. | 360/244.2 |

FOREIGN PATENT DOCUMENTS

JP 04182470 2/1994

OTHER PUBLICATIONS

IBM Technical Disclosure Bulletin; vol. 36, No. 09A, Sept., 1993.

IBM Technical Disclosure Bulletin; vol. 36, No. 04, Apr., 1993.

* cited by examiner

*Primary Examiner*—David Davis
(74) *Attorney, Agent, or Firm*—Robert B. Martin; Bracewell & Patterson L.L.P.

(57) ABSTRACT

An integrated suspension for a hard disk drive is formed as a single-piece flat assembly. The design eliminates the need for mechanical reinforcement such as flange forming, and requires no additional weld processing to form the functional portion of the assembly. A partial etch process is used to reduce local thicknesses in the gimbal and hinge areas to reduce the overall stiffness of the suspension. The proximal end structure of the suspension is also built by partial etching to achieve higher natural frequencies. The suspension design also incorporates built-in load/unload features and two-sided, opposite-facing limiters to limit excessive slider displacement during the manufacturing process, loading/unloading, and non-operational shock environments.

12 Claims, 2 Drawing Sheets

HIGH PERFORMANCE SUSPENSION WITH REDUCED FLOW-INDUCED VIBRATION

BACKGROUND OF THE INVENTION

1. Technical Field

The present invention relates in general to improved hard disk drive performance, and in particular to an improved suspension for hard disk drives. Still more particularly, the present invention relates to an improved, integrated gimbal design for a disk drive suspension.

2. Description of the Prior Art

Generally, a data access and storage system consists of one or more storage devices that store data on storage media such as magnetic or optical data storage disks. In magnetic disk storage systems, a storage device is called a direct access storage device (DASD) or hard disk drive (HDD), which includes one or more hard disks and an HDD controller to manage local operations concerning the disks. Hard disks are rigid platters, typically made of aluminum alloy or a mixture of glass and ceramic, covered with a magnetic coating. Typically, two or three platters are stacked vertically on a common spindle that is turned by a disk drive motor at several thousand revolutions per minute (rpm).

The only other moving part within a typical HDD is the head stack assembly. Within most drives, one read/write head is associated with each side of each platter and flies just above or below the platter's surface. Each read/write head is mounted on a suspension to form a head gimbal assembly (HGA). The HGA is then attached to a semi-rigid arm apparatus which supports the entire head flying unit. More than one of such arms may be utilized together to form a single armature unit.

Each read/write head scans the hard disk platter surface during a "read" or "write" operation. The head/arm assembly is moved utilizing an actuator which is often a voice coil motor (VCM). The stator of a VCM is mounted to a base plate or casting on which is also mounted the spindle supporting the disks. The base casting is in turn mounted to a frame via a compliant suspension. When current is fed to the motor, the VCM develops force or torque which is substantially proportional to the applied current. The arm acceleration is therefore substantially proportional to the magnitude of the current. As the read/write head nears the desired track, a reverse polarity signal is applied to the actuator, causing the signal to act as a brake, and ideally causing the read/write head to stop directly over the desired track.

Conventional disk drive suspensions are made as either two pieces including a load beam and a flexure, or as a single, integrated gimbal assembly. In order to increase the stiffness of the suspension and its dynamic performance, flanges are typically formed on the suspension. Unfortunately, the extra forming step changes the flatness of the suspension and increases its overall thickness, such that the dynamic performance of the suspension is downgraded. In addition, the two-piece suspension designs require an extra laser welding processing step to assemble the pieces together. This welding process requires additional tooling and introduces assembly tolerances as well. Moreover, the weld process tends to distort the suspension due to high welding temperatures, and degrades the dynamic performance and quality control for the suspension. Thus, an improved disk drive suspension design that overcomes the limitations of the prior art is needed.

SUMMARY OF THE INVENTION

An integrated suspension for a hard disk drive is formed as a single-piece flat assembly. The design eliminates the need for mechanical reinforcement such as flange forming, and requires no additional weld processing to form the functional portion of the assembly. A partial etch process is used to reduce local thicknesses in the gimbal and hinge areas to reduce the overall stiffness of the suspension. The proximal end structure of the suspension is also built by partial etching to achieve higher natural frequencies. The suspension design also incorporates built-in load/unload features and two-sided, opposite-facing limiters to limit slider displacement during the manufacturing process, loading/unloading, and non-operational shock environments.

Accordingly, it is an object of the present invention to provide improved hard disk drive performance.

It is an additional object of the present invention to provide an improved suspension for hard disk drives.

Still another object of the present invention is to provide an improved, integrated gimbal design for a disk drive suspension.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
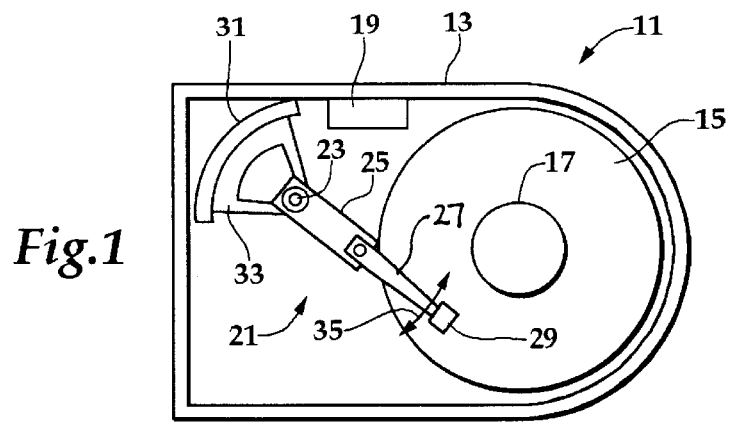
FIG. 1 is a schematic diagram of a conventional hard disk drive.

Referring to FIG. 1, a schematic drawing of an information storage system comprising a magnetic hard s disk file or drive 11 for a computer system is shown. Drive 11 has an outer housing or base 13 containing a plurality of stacked, parallel magnetic disks 15 (one shown) which are closely spaced apart. Disks 15 are rotated by a spindle motor located therebelow about a central drive hub 17. A plurality of stacked, parallel actuator arms 21 (one shown) are pivotally mounted to base 13 about a pivot assembly 23. A controller 19 is mounted to the base for selectively moving arms 21 relative to disks 15.

In the embodiment shown, each arm 21 comprises a mounting support 25, a pair of parallel, cantilevered load beams or suspensions 27 extending from each mounting support 25, and a head gimbal assembly 29 having at least one magnetic read/write head secured to each suspension 27 for magnetically reading data from or magnetically writing data to disks 15. Suspensions 27 have a spring-like quality which biases or maintains them in parallel relationship relative to one another. A motor assembly 31 having a conventional voice coil motor is also mounted to pivot assembly 23 opposite head gimbal assemblies 29. Movement of an actuator driver 33 (indicated by arrow 35) moves head gimbal assemblies 29 radially across tracks on the disks 15 until the heads on assemblies 29 settle on the target tracks. The head gimbal assemblies 29 operate in a conventional manner and always move in unison with one another, unless drive 11 uses a split actuator (not shown) wherein the arms move independently of one another.

Figure 2:
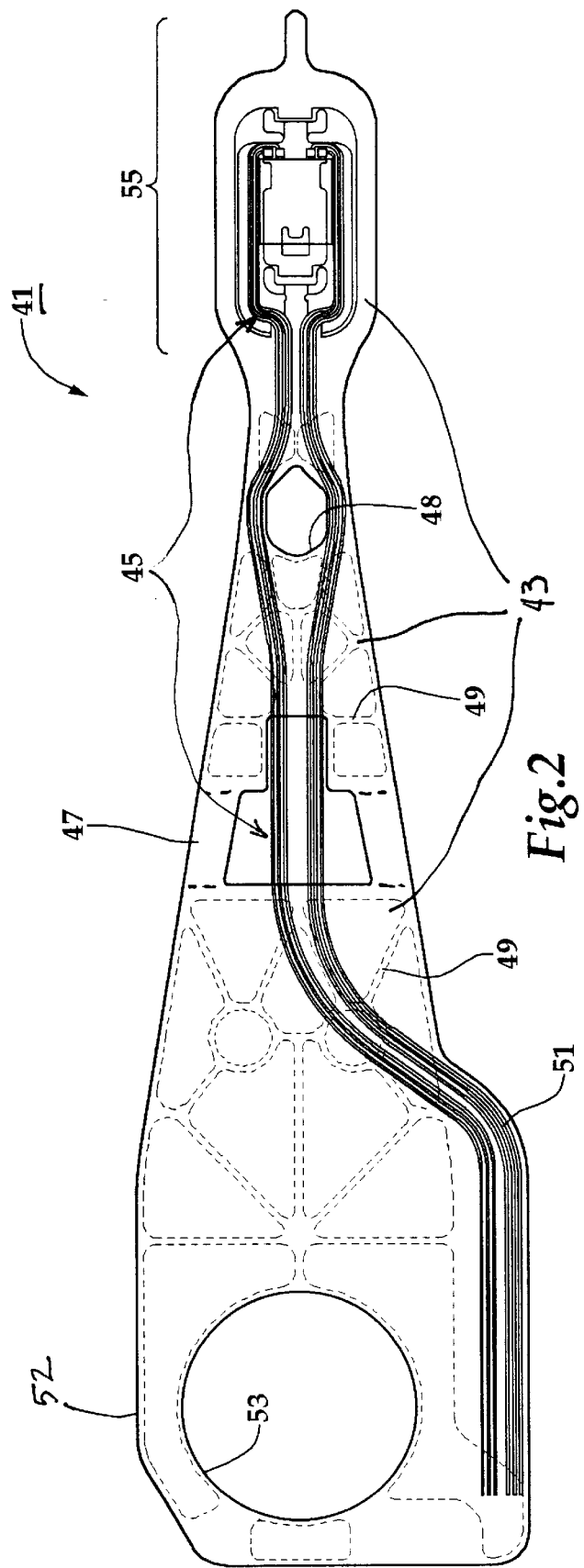
FIG. 2 is a top plan view of a suspension for the hard disk drive of FIG. 1 and is constructed in accordance with the invention.

Referring now to FIG. 2, an improved suspension 41 for a hard disk drive such as drive 11 is shown.

Figure 3:
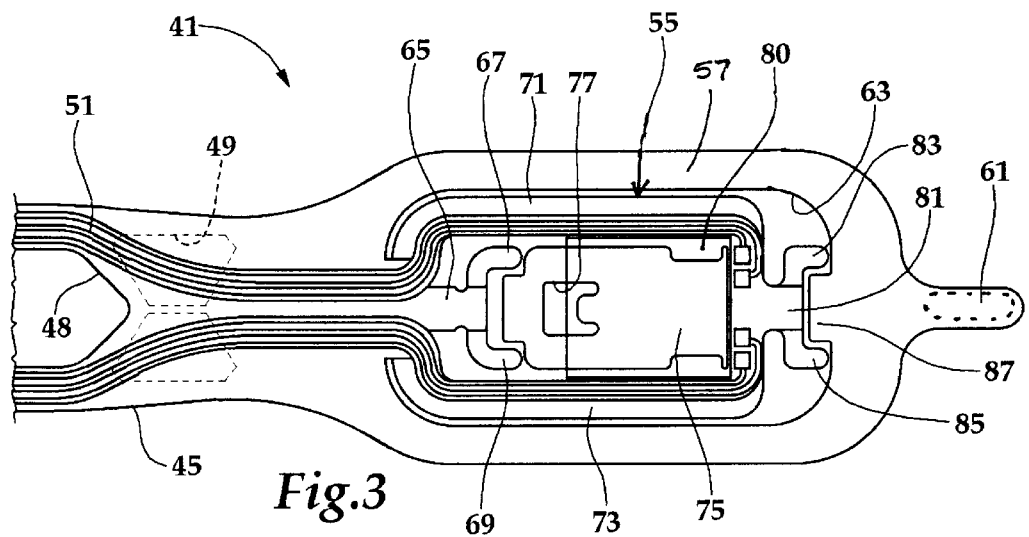
FIG. 3 is an enlarged top plan view of a gimbal portion of the disk drive suspension of FIG. 2.
Figure 4:
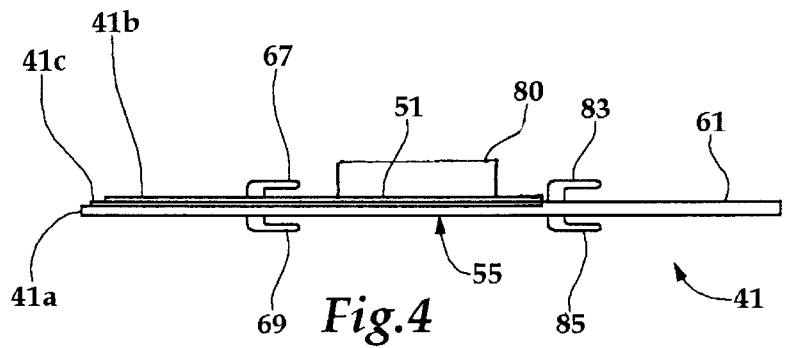
FIG. 4 is a side elevational view of the gimbal portion of FIG. 3.

Suspension 41 is a unitary, flat design that is formed from a three-ply laminate of stainless steel 41a, copper 41b, and a dielectric such as polyimide 41c (see FIG. 4). The copper and dielectric layers of the laminate have approximate thicknesses of about 3 to 20 microns. The stainless steel layer has a thickness of about 18 to 100 microns to meet different dynamic performance requirements. Suspension 41 integrally joins a load beam portion 43 with the traditionally separate flexure portion 45 to form a single integrated suspension from the laminated material. Suspension 41 also has an integrally formed base or mount plate 52 with a mounting hole 53. A hinge 47 and a set of flexure outriggers 71, 73 (FIG. 3) are formed from the stainless steel layer, and may be partially and/or fully etched, depending upon the application. The hinge 47 is provided for achieving an appropriate gram load in suspension 41. Suspension 41 also has a datum tooling hole 48 and numerous partially-etched pockets 49, as indicated by the dashed lines in FIG. 2.

A plurality of conductor traces 51 are formed from the copper layer and extend along substantially the entire length of suspension 41. Traces 51 wind in a circuitous pattern from the proximal end of suspension 41 near mounting hole 53, to the integrated gimbal section 55 on the distal or functional end of suspension 41. Note that suspension 41 requires no additional laser welding, and that it has no enhanced structural formations, such as reinforcement flanges, which are commonly required in prior art one piece designs for needed strength.

As shown in FIGS. 3 and 4, load beam 43 of suspension 41 has a partially-etched, cup-formed load/unload tab 61 at its tip. Gimbal section 55 is provided for supporting magnetic read/write heads or sliders 80 while maintaining flexibility to accommodate pitch and roll relative to the adjacent spinning disk. The load beam 43 circumscribes the flexure gimbal 55 to form a frame-like structure 57 around gimbal 55. The us frame 57 merges back together at load/unload tab 61, beyond the distal end of gimbal 55 such that gimbal 55 is completely surrounded. Structure 57 has a central opening 63 into which protrudes a small rear limiter 65 having an upward-formed tab or ear 67 and a downward-formed ear 69, as illustrated. Rear limiter 65 and its ears 67, 69 are also partially-etched. Ears 67, 69 are provided for limiting the displacement of sliders 80 relative to the load beam 43.

A pair of partially-etched flexure legs or outriggers 71, 73 extend between opening 63 and rear limiter 65. Outriggers 71, 73 extend forward into opening 63 from approximately the same origin as rear limiter 65 and are separated from contacting the opening 63 frame 57 by a small clearance. However, outriggers 71, 73 have a rearward-extending, generally rectangular flexure tongue 75 that protrudes back toward rear limiter 65 but does not contact rear limiter 65 or its ears 67, 69. Flexure tongue 75 has an open window 77 for laser and/or UV light access for curing head bonding adhesives. Note that traces 51 extend from flexure 45 to gimbal 55 and follow along outriggers 71, 73, before winding onto flexure tongue 75. Magnetic read/write heads or sliders 80 are joined to these distal ends of traces 51.

A front limiter 81 extends forward from the front ends of flexure outriggers 71, 73 from the same general area that flexure tongue 75 extends rearward. Like rear limiter 65, front limiter 81 is partially-etched and has an upward-formed ear 83 and a downward-formed ear 85. However, the directions of deflection of ears 83, 85 are elevationally inverted relative to ears 67, 69, as shown in FIGS. 3 and 4. Front limiter 81 and ears 83, 85 do not contact the small tab 87 protruding rearward into opening 63 of frame 57. Limiters 65, 81 limit excessive displacement of sliders 80 during the manufacturing process, loading/unloading, and non-operational shock environments.

The invention has several advantages including the elimination of structural formations and additional forming tooling to increase stiffness of the suspension. Unlike prior art two-piece suspension designs, no laser welding is required to assemble the load beam and flexure. This simplification eliminates load beam/flexure assembly tolerances, except for etching tolerances which are minimal. In addition, there is no limiter engagement tolerance due to assembly. The head termination and slider bonding process is flexible to accommodate different applications, and is gold and/or solder ball compatible. The exposed flexure legs make pitch/roll static attitude adjustments possible without the need to offset the flexure legs, while the ears limit excessive slider motion relative to the load beam and improve; the HGA's integrity. The partially-etched load beam increases the natural frequencies of the suspension with minimal mass and inertia. The suspension is very flat and free of mechanical and thermal distortions, thereby reducing air flow-induced vibration. This suspension design is compatible with integrated lead suspensions (ILS) with either subtractive or additive processing. Integrating the ILS flexure with the load beam can also provide extra damping due to the imbedded polymer. This design is also more flexible in terms of part length variation for different drive platforms such that design convergence is possible.

While the invention has been shown or described in only some of its forms, it should be apparent to those skilled in the art that it is not so limited, but is susceptible to various changes without departing from the scope of the invention.

What is claimed is:

1. A suspension for a disk drive, comprising:
   an integrated suspension body having a unitary, continuous load beam, flexure, and gimbal, wherein the integrated suspension body is free of assembly welds and structural forming for enhancing mechanical strength of the integrated suspension body;
   a plurality of pockets in the load beam and flexure of the integrated suspension body;
   a load/unload feature on the integrated suspension body; and wherein the gimbal comprises:
   an etched gimbal assembly including outriggers and front and rear limiters for limiting slider displacement relative to the load beam.

2. The suspension of claim 1 wherein the gimbal assembly is partially-etched.

3. The suspension of claim 1 wherein the load beam circumscribes the gimbal assembly and merges with the load/unload feature on a distal end of the suspension.

4. The suspension of claim 1 wherein each of the front and rear limiters have a pair of ears protruding in opposite elevational directions.

5. The suspension of claim 4 wherein the ears on the front limiter are inverted relative to each other, and the ears on the rear limiter are inverted relative to each other.

6. The suspension of claim 1 wherein the integrated suspension body is formed from a laminate having a stainless steel layer that serves as a supporting a structure for both the load beam and the flexure.

7. The suspension of claim 1 wherein a mount plate is integrally formed on a rear portion of the integrated suspension body.

8. A suspension for a disk drive, comprising:

an integrated suspension body having a unitary, continuous mount plate, load beam, flexure, and gimbal, wherein the integrated suspension body is free of assembly welds and structural forming for enhancing mechanical strength of the integrated suspension body;

a plurality of pockets in the mount plate, load beam and flexure of the integrated suspension body;

a load/unload feature on a distal end of the flexure;

a frame formed in the flexure and having an opening, wherein the frame surrounds the gimbal such that the gimbal is located within the opening; and wherein the gimbal comprises:

an etched gimbal assembly including outriggers and front and rear limiters for limiting slider displacement relative to the load beam.

9. The suspension of claim 8 wherein the gimbal assembly is partially-etched.

10. The suspension of claim 8 wherein each of the front and rear limiters have a pair of ears protruding in opposite elevational directions.

11. The suspension of claim 10 wherein the ears on the front limiter are inverted relative to each other, and the ears on the rear limited are inverted relative to each other.

12. The suspension of claim 8 wherein the integrated suspension body is formed from a laminate having a stainless steel layer that serves as a supporting structure for both the load beam and the flexure.

* * * * *